Sept. 9, 1969 R. U. AYRES ET AL 3,465,689
MOVING SIDEWALK
Filed Jan. 17, 1967 2 Sheets-Sheet 1
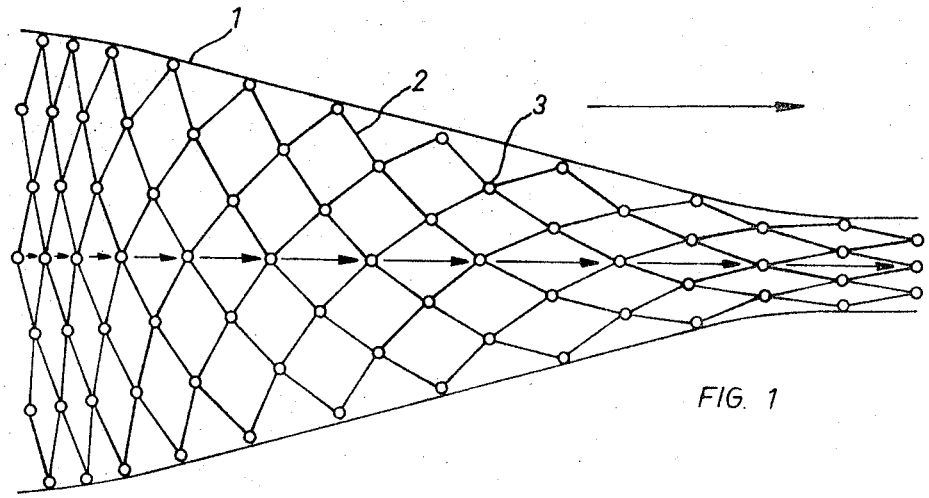
FIG. 1
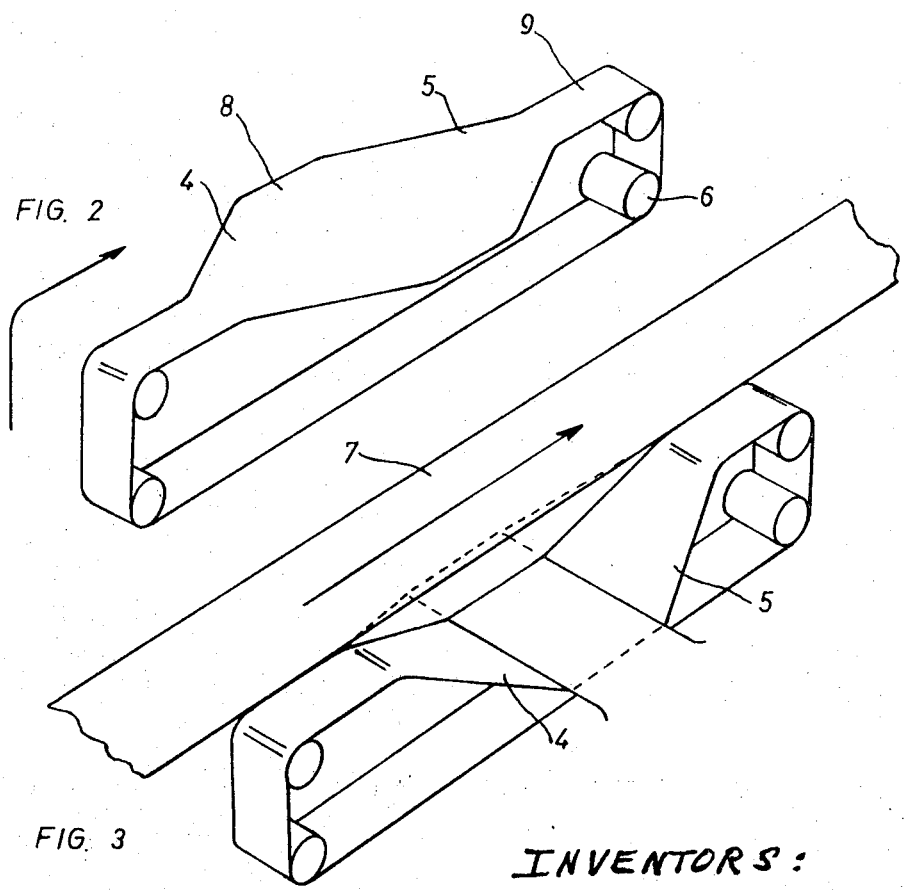
FIG. 2
FIG. 3
INVENTORS:
ROBT. U. AYRES
RICH. P. McKENNA Sept. 9, 1969  R. U. AYRES ET AL  3,465,689
MOVING SIDEWALK
Filed Jan. 17, 1967  2 Sheets-Sheet 2

INVENTORS:
ROBT. U. AYRES
RICH. P. McKENNA

United States Patent Office 3,465,689
Patented Sept. 9, 1969

3,465,689
MOVING SIDEWALK
Robert Underwood Ayres, Croton-on-the-Hudson, N.Y.
(2853 Ontario Road NW., Washington, D.C. 20009),
and Richard Phillip McKenna, Miami, Fla. (5409
Huntington Parkway, Bethesda, Md. 20014)
Filed Jan. 17, 1967, Ser. No. 609,864
Int. Cl. B63b 13/00; B65g 15/06, 15/28
U.S. Cl. 104—25                                              2 Claims

ABSTRACT OF THE DISCLOSURE

This invention relates to moving sidewalks and entry and exit means for such sidewalks, including means whereby a mesh belt is constructed to vary in width as it moves so that the speed of the belt at one locus may be substantially more than walking speed, while being of the order of magnitude of walking speed at a second locus.

---

Figure 4:
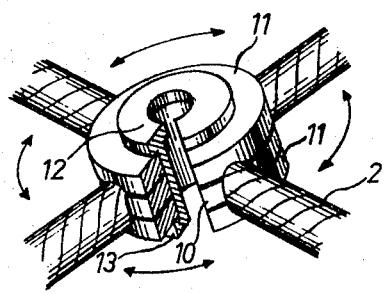

This invention relates to the art of moving sidewalks and particularly to such sidewalks, as are equipped with entry and exit means.

One of the major problems facing man today is that of mass transportation in the densely populated centers of major cities. The transport technique that offers perhaps the greatest potential for doing this efficiently is the continuously moving walkway or roadway. The "people conveyor" idea is hardly new; it has been proposed many times in the past. However, the key to practical embodiment of the moving roadway lies in the method used for getting people on and off the moving strip. The speeds of the entry or exit ramps, and the conveyor belt itself, must be matched as closely as possible. Yet, since the beltway is to be used by people of all ages and physical conditions the speed changes must be effected as smoothly and with as high a degree of safety as possible. Past proposals usually have entailed a set of adjacent parallel strips, each with a slightly higher speed than the last, the final speed being achieved by a series of discrete increments. This method implies a considerable amount of mechanical complexity, and, of course, the greater the number of speed-change interfaces, the more opportunities for mechanical breakdowns or accidents.

The ideal entry/exit technique should effect the necessary speed change (i.e., acceleration) smoothly and gradually, preferably with no sharp "stepwise" discontinuities at all. While it would be very difficult to eliminate such discontinuities completely, it *is* possible via the means of this invention to achieve a reasonable final speed (12–15 m.p.h.) smoothly, with only a single velocity-interface point, or, in case a fairly high speed is desired, at most two, involving a discrete speed change of say 3 m.p.h. or less.

The principal object of this invention is a new and improved moving sidewalk provided with entry and exit means. A further object is such a sidewalk wherein the entry and exit means are adapted to operate at a speed of the order of magnitude of as low as 3 m.p.h. or less at a locus removed from the main portion of the moving sidewalk, while achieving simultaneously a fairly high speed of the order of magnitude of roughly 12 to 15 m.p.h. in a locus adjacent to the main portion of the moving sidewalk. Additional objects will be appreciated from the following detailed description of the invention.

The problem of achieving effective acceleration is essentially to simulate, mechanically, the flow of a fluid. If a fluid is forced through a narrow constriction, the speed of the flow increases, and vice versa. One practical means of doing this is by means of a moving strip of a mesh or "fishnet-like" composite material; the unit "cells" of this mesh are roughly parallelepipeds having fairly inextensible sides but variable angles—in short, providing a "two-way stretch" capability. If a belt constructed in this fashion is forced into a funnel-shaped constriction, the gradual narrowing and elongation of each cell along the line of motion will gradually increase the speed of anything riding on its surface.

The principles of the invention may be understood more readily by referring to the various figures of the drawings.

Figure 5:
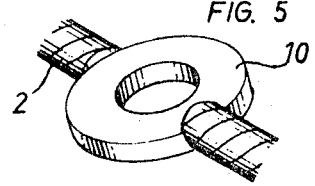
Figure 6:
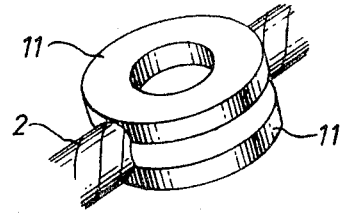
Figure 7:
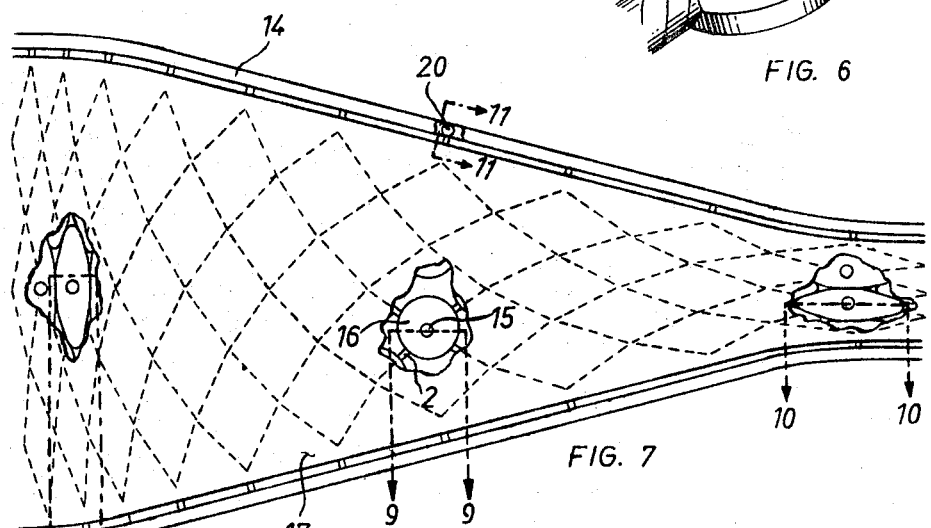
Figure 8:
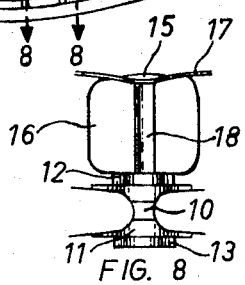
Figure 9:
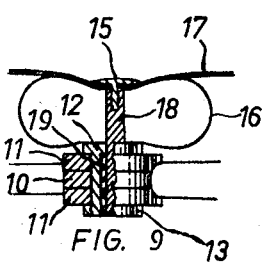
Figure 10:
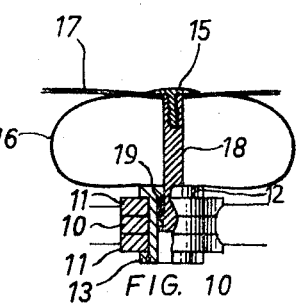
Figure 11:
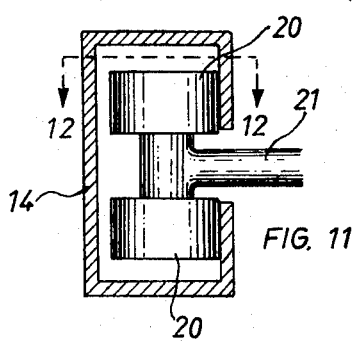
Figure 12:
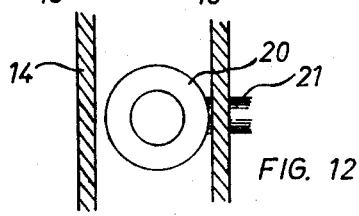

Referring generally to the various figures, FIGURE 1 is a general layout showing the basic principle by which the system operates, the two-way expansion and contraction of a mesh-type of configuration. FIGURE 2 is a general embodiment of such a deformable speed change belt with decelerating section, low speed section, accelerating section, high speed section and rollers. FIGURE 3 is a view of the unit of FIGURE 2 disposed in conjunction with a constant-high-speed belt. FIGURE 4 is a view of a mesh cell node. FIGURE 5 is a view of the cell structural member 2, fastened to the single ring 10. FIGURE 6 is a view of the structural member 2 fastened to the double ring 11. FIGURE 7 is a view of a speed-change belt device. FIGURES 8, 9 and 10 are cut-away detail views of a node and toroid in compressed and uncompressed form. FIGURE 11 is a cut-away view of the guide roller assembly. FIGURE 12 is a cut-away view of FIGURE 11 as indicated.

Referring in greater detail to the various parts of the drawings and their function:

FIG. 1 shows the basic principle by which the system operates, the two-way expansion and contraction of a mesh-type of configuration. The overall belt is item 1, the structural members of the mesh cells are item 2, and the nodes at which they join are item 3.

FIG. 2 shows a typical general embodiment of such a deformable speed-change belt, with decelerating section 4, low-speed section 8, accelerating section 5 and high speed section 9. The belt returns on itself via suitable rollers 6. Obviously, there are variations; it could return on itself at the widened-out low speed, or it could even form a flat closed loop and not return underneath at all.

FIG. 3 shows a possible application of the type of unit shown in FIGURE 2, operating in conjunction with a constant-high-speed belt 7. In this case, it's serving in what is probably its ideal function—providing a smooth continuous acceleration and/or deceleration from some low speed to a high speed. The deceleration and acceleration sections (4 and 5) in such an embodiment would be offset somewhat (in this case, tilted downwards) from the plane of the main belt so that the expanding fan of the speed-change sections won't interfere with the constant speed operation of the main belt. The high-speed sections of the speed-change belt here would, of course, be moving at the same speed as the main constant speed belt.

FIG. 4 shows one embodiment of a mesh cell node. Cell structural members 2 are suitably fastened (e.g., welded) to single rings 10 or double rings 11 (shown separately in FIGURES 5 and 6): the structural members 2 are shown as cables, but may be any strong nonrigid material. Flanged central bushing 12 is inserted into the center of the assembled rings 10 and 11, and secured with locking ring 13.

FIG. 7 shows a typical embodiment of the speed-change belt technique. The surface of the belt or mesh itself (17) is of some suitable two-way stretchable material, secured at the nodes by the caps 15, which are in turn fastened to the flanged shafts 18. These shafts are spring-loaded by helical spring 19 inside of the nodal central bushings 12, which are flanged at the top. Shafts 18 are movable (up and down) inside the bushing 12. Toroid 16 is an elastic deformable cushion, which may be composed either of a solid elastic material or of an inflatable "balloon-like" material, or alter-natively, can be prepared of a spongy material such as, for instance, sponge rubber or sponge plastic or the like. These toroids deform as necessary when compressed; they form a support cushion for the rider, and are not essential to the operation of deceleration or acceleration.

FIGURES 8, 9 and 10 show detail views of a node and toroid when compressed and uncompressed. As an alternative, belt 17 need not be secured at every node—for example, it might be secured at every other one. In this case, at the alternate nodes the caps 15 and shafts 18 secure only the toroids 16. The belt is forced to expand and compress by a roller assembly travelling along guideway 14, see FIGURE 7.

FIG. 11 is a cutaway of the guide roller assembly. Rollers 20 are mounted on T-shaft 21, which is secured to the rings 10 or 11 of the outer nodes in much th same way as are cell members 2.

FIG. 12 is a cutaway of FIG. 11, as indicated. Rollers 20 ride against either side of guideways 14, depending on whether the belt is being forced to expand or contract.

The overall belt itself, of course, rides on some conventional roller configuration.

In operation, when the speed $V_2$ has reached that of the moving belt (in practice, about 15 m.p.h. or so), the strip can be made to run immediately adjacent to the main continuous belt itself. Not only is the interface between them mechanically simple but it is easy to ensure *zero* velocity differential across it; thus the acceleration from walking speed to that of the belt can be made with almost complete smoothness after the initial entry (which would be similar to a conventional escalator). The exit procedure is, of course, the same process in reverse (see FIGURE 2).

The ratio of the final beltway speed $V_2$ to the inittial entry speed $V_1$ will be in exact proportion to the ratio of maximum and minimum belt widths $S_1$ and $S_2$. In short, if the "funnel" constricts by a factor of 5, say, the speed through the "funnel" eixt will increase by the same factor over the entrance velocity. For example, if the initial speed $V_1$ is about 4 f.p.s. (roughly 3 m.p.h.) and the funnel constriction ratio is 5 to 1, the final speed $V_2$ will be 20 f.p.s. or about 15 m.p.h.; at 6 to 1, it will be 18 m.p.h. and so on—depending, of course, on $V_1$. An optimum value must be found for $V_1$ which is as high as possible, but not so high as to make entry precarious for elderly or unstable predestrians (e.g., pregnant women).

The entry/exit ramp strip, of course, is returned to its starting point in a continuous belt fashion, probably underground. In practice, exits and entries would normally be combined, possibly as shown in FIGURE 3. For shorter-range 2-point interconnections in fact, the system would function as a self-contained relatively high-speed moving belt with its own built-in entry and exit ramps.

The continuous velocity-changing strip described above can, of course, be "cascaded" if it is found that a single stage is inadequate to achieve the desired final speed. Any number of stages could be used in principle, although there are practical limits imposed by the necessity of minimizing mechanical complexity as much as possible.

The underlying structure of the mesh can be based on any strong, inextensible fiber or metal, rods, wires or cables, the only requirement being that angular degrees of freedom be preserved around the intersections or "nodes" where adjacent parallelepipeds (cells) meet.

It would obviously be desirable to make the basic cell as deformable as possible, in the sense of maximizing the angular degrees of freedom around the "nodes." In practice, this will probably mean about a 5 or 6 to 1 length-to-width ratio depending on the size of the individual cell and the materials of construction. Even a 10 to 1 ratio may be possible.

The mesh-strip would be pulled through the funnel constriction. A motor, or motors, mounted on the stationary support structure, would drive the strip by a suitable transmission. The optimum design of the mating drive mechanism (for example, a link-chain fastened along the outer edges of the strip) remains to be determined, depending on a number of engineering factors. For example, in addition to being moved, the strip must be expanded back to its maximum width; it must also be supported during its return journey. Thus, the drive chain or other mechanism along the sides of the strip will presumably be designed to ride in a groove or track such that the necessary expansion and support functions would automatically be provided.

The actual outer walking or standing surface of the composite conveyor-belt structure could be made of a finer version of the basic mesh, or of some strong but resilient fabric or rubber-like material which is also capable of being stretched in two directions, either *along* the line of travel or *across* it, although not at the same time (i.e., extension in one dimension is accompanied by a corresponding compression in the orthogonal dimension). This material would be secured to the underlying mesh structure by suitable means at the cell "node" points.

The basic structural members of the conveyor belt may be rods, braided cable metal strips, heavy wire, or any other substance with a considerable amount of tensile strength and a moderate degree of stiffness against bending (although extreme rigidity is unnecessary and would be a liability). A simple embodiment can be constructed from heavy (e.g., coat-hanger) wire and ordinary washers, as shown in FIGURE 4.

Single loops and double loops might be alternated so that the "hinge" (e.g., a nylon or metal grommet or rivet) at each node remains balanced with regard to sheer- forces, as shown in FIGURE 5.

To provide a solid but comfortable surface to walk on, it is suggested that small flexible inflated or sponge-rubber or rubber-like "tires" (or "mushroom caps") be fixed above each cell node by means of rivets or bolts or similar arrangements to the hinges (FIGURES 8–10). The flexible spheroids or toroids will deform easily in both horizontal and vertical dimensions to fill the available space. Thus, when the basic cells are square the air cushions will tend to take square shapes with rounded corners; however when the cells are highly elongated, the air cushions will tend to look more like elongated hexagons. The two situations are illustrated in FIGURE 7.

For practical usage, prior art techniques depend on the development of materials which have both the requisite elasticity and tensile strength. The deformable "fishnet" type of accelerator of this invention can be built to achieve the speed-change function with fairly conventional "off-the-shelf" components and materials.

It will be appreciated that in any practical embodiment of the speed-change strip, or of the moving beltway in general, some kind of rail or other protective device must be installed along the sides; this rail must offer solid support to the rider and, at the same time, must change speed with him. This can be done simply by applying the same basic principle used in the accelerator floor, on a somewhat smaller or narrower scale and any of the above acceleration-deceleration techniques may be used. In this case, in fact, the expanding wormscrew approach might be simpler, since the outer surface of the rail need not be smooth and continuous. For example, a series of rings in an expandable "accordion" sheath (or possibly an overlapping "armadillo-shell") covering would offer a suitable surface for hand-holds while still being able to expand and accelerate with the rider. A rail constructed in this segmented manner would have to be designed so that even at its lowest speed, and therefore closest contraction, sufficient clearance would exist between successive rings or segments for free hand movement.

The detailed design would depend on the configuration of the overall moving walkway system. Whatever the technique used, however, it is evident that an accelerating, continuously moving support handrail can be implemented quite easily.

Many variations are obviously possible in design. But the essential characteristic of the system—that of a continuously moving strip of a two-way stretchable mesh structure which would impart gradually increasing speed to a point on its surface as the strip moves into a "funnel" or constriction—would seem to offer an eminently practical method of moving people of all kinds onto and off to moving conveyor belts. The moving beltway, in turn, offers a most attractive potential for low-speed (i.e., under 30 m.p.h.) short range urban mass transport.

While we have described our invention in the foregoing in connection with its application for use as a moving sidewalk which is certainly our preferred embodiment, we do not wish to be limited to this particular use, but intend to include within the scope of the invention, any such devices and means whether they be applied to moving sidewalks, conveyors for goods or other purposes. We intend to be limited, therefore, only by the following patent claims.

We claim:
1. A moving sidewalk provided with an entry-exit means comprising a strip movably disposed to run adjacent to a main belt, said strip being constructed so as to vary in width as it moves whereby, it is capable of attaining a speed of an order of magnitude of 15 m.p.h. adjacent to said main belt while moving at a speed of the order of magnitude of 3 m.p.h. in a location away from said main belt, said strip comprising a mesh, the individual cells of which are parellelograms characterized by inextensive sides laterally flexible with variable angles to provide a longitudinal stretch along the direction of motion accompanied by a lateral constriction perpendicular to the direction of motion accomplished by the gradual narrowing and elongation of each cell along the line of motion which will gradually increase the speed of the strip through the said constriction.

2. A moving sidewalk provided with an entry-exit means, said sidewalk comprising a movable strip, said strip being constructed so as to vary in width as it moves, whereby it is capable of attaining a speed substantially in excess of normal walking speed at one locus, while moving at a speed of the order of magnitude of walking speed at a second locus, said strip comprising a mesh, the individual cells of which are parallelograms characterized by inextensive sides laterally flexible with variable angles to provide a longitudinal stretch along the direction of motion accompanied by a lateral constriction perpendicular to the direction of motion accomplished by the gradual narrowing and elongation of each cell along the line of motion which will gradually increase the speed of the strip through the said constriction.

References Cited
UNITED STATES PATENTS

| | | | |
|---|---|---|---|
| 1,383,220 | 6/1921 | Lamar | 104—20 |
| 1,412,896 | 4/1922 | Sachs | 104—25 |
| 1,718,085 | 6/1929 | Sene | 104—25 |
| 2,973,720 | 3/1961 | Bourassa | 104—25 |
| 2,981,202 | 4/1964 | Turner | 104—25 |

ARTHUR L. LA POINT, Primary Examiner

D. F. WORTH III, Assistant Examiner